United States Patent
Liao et al.

(10) Patent No.: US 11,593,231 B2
(45) Date of Patent: Feb. 28, 2023

(54) METHODS FOR BACKUP AND RECOVERY

(71) Applicant: EMC IP Holding Company LLC, Hopkinton, MA (US)

(72) Inventors: Mengze Liao, Shanghai (CN); Lihui Su, Shanghai (CN); Weiyang Liu, Shanghai (CN); Yun Zhang, Shanghai (CN); Yujun Liang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 17/238,836

(22) Filed: Apr. 23, 2021

(65) Prior Publication Data
US 2022/0197758 A1   Jun. 23, 2022

(30) Foreign Application Priority Data
Dec. 18, 2020   (CN) .......................... 202011507744.4

(51) Int. Cl.
*G06F 12/00*   (2006.01)
*G06F 11/14*   (2006.01)
*G06F 3/06*   (2006.01)

(52) U.S. Cl.
CPC .......... *G06F 11/1469* (2013.01); *G06F 3/064* (2013.01); *G06F 3/067* (2013.01); *G06F 3/0619* (2013.01); *G06F 3/0665* (2013.01); *G06F 11/1435* (2013.01); *G06F 11/1451* (2013.01); *G06F 11/1464* (2013.01)

(58) Field of Classification Search
None
See application file for complete search history.

(56) References Cited

U.S. PATENT DOCUMENTS

| | | | |
|---|---|---|---|
| 2003/0177324 A1* | 9/2003 | Timpanaro-Perrotta | G06F 11/1448 711/158 |
| 2016/0070623 A1* | 3/2016 | Derk | G06F 9/45558 714/6.23 |
| 2016/0077900 A1* | 3/2016 | Wada | G06F 11/008 719/318 |

* cited by examiner

*Primary Examiner* — Daniel D Tsui
(74) *Attorney, Agent, or Firm* — Chamberlain, Hrdlicka, White, Williams & Aughtry

(57) ABSTRACT

Methods for backup and recovery are disclosed. The method includes determining, based on attributes of at least one of one or more files included in data to be backed up, priorities of data blocks associated with the at least one file and storing the data to be backed up and indications of the determined priorities of the data blocks to a second storage device. The methods may determine data blocks that are more important for recovery while backing up data, so that backup data can be recovered faster in future.

15 Claims, 10 Drawing Sheets

Last start time Now

| Time range |
|---|

FIG. 4A

Last start time Now

| 30 minutes | 30 minutes | 30 minutes | ...... | 30 minutes | 30 minutes | 30 minutes |
|---|---|---|---|---|---|---|

FIG. 4B

Last start time Now

| Priority 1 | Priority 2 | Priority 3 | ...... | Priority 3 | Priority 2 | Priority 1 |
|---|---|---|---|---|---|---|

FIG. 4C

Last start time Now

| Kern.log ...... | Libc.so ...... | ...... | App.dat ...... | App.journal ...... |
|---|---|---|---|---|
| Priority 1 | Priority 2 | | Priority 2 | Priority 1 |

FIG. 4D

METHODS FOR BACKUP AND RECOVERY

CROSS REFERENCE TO RELATED APPLICATION

This application claims priority under 35 U.S.C. § 119 to Chinese Patent Application No. 202011507744.4, filed on Dec. 18, 2020. The contents of Chinese Patent Application No. 202011507744.4 are incorporated by reference in its entirety.

TECHNICAL FIELD

Embodiments of the present disclosure relate to the field of computers and, more particularly, to a method for backup, a method for recovery, a computing device, a computer-readable storage medium, and a computer program product.

BACKGROUND

With the development of cloud computing and virtualization technologies, more and more Internet service providers host their servers and business data to virtual machines of computing infrastructures located in a cloud and regularly back up their data to data warehouses. When it is necessary to recover from a data warehouse, for example, when a computing infrastructure in the cloud unfortunately fails, the data that has been backed up is requested from the data warehouse and stored locally to restart a virtual machine and recover a service.

Although infrequent, it is still expected that the service can be recovered as soon as possible after the interruption. Since the volume of backup data is usually hundreds of gigabytes (GBs) or even more, the time to recover the service is long, and the usual recovery time objective (RTO) is as long as several hours or even days, which cannot meet business needs. This poses a challenge for cloud computing and cloud storage technologies.

SUMMARY OF THE INVENTION

The present disclosure provides a technical solution that facilitates faster service recovery from backup data to improve the operational stability and user experience of cloud computing service providers.

According to a first aspect of the present disclosure, a method for backup is provided that includes determining, based on attributes of at least one of one or more files included in data to be backed up, priorities of data blocks associated with the at least one file and storing the data to be backed up and indications of the determined priorities of the data blocks to a second storage device.

According to a second aspect of the present disclosure, a method for recovery is provided that includes receiving from a second storage device an indication of a first priority and an indication of a second priority that are related to data to be recovered. The first priority is associated with a first set of data blocks, the second priority is associated with a second set of data blocks, and the first priority is higher than the second priority. The method includes receiving the first set of data blocks from the second storage device; and receiving, after the first set of data blocks is completely received, the second set of data blocks from the second storage device.

According to a third aspect of the present disclosure, a computing device is also provided that includes at least one processing unit; and at least one memory that is coupled to the at least one processing unit that stores instructions for execution by the at least one processing unit. The instructions, when executed by the at least one processing unit, cause the computing device to perform the method of one of the first and second aspects of the present disclosure.

According to a fourth aspect of the present disclosure, a non-transient computer storage medium is also provided that includes machine-executable instructions that, when executed by a device, cause the device to perform the method of one of the first and second aspects of the present disclosure.

According to a fifth aspect of the present disclosure, a computer program product is also provided that includes machine-executable instructions that, when executed by a device, cause the device to perform the method of one of the first and second aspects of the present disclosure.

In accordance with embodiments disclosed herein, it is possible to determine data blocks that are more important for recovery while backing up data, so that backup data can be recovered faster in future. Accordingly, when recovering data, data blocks that are more important for recovery can be received preferentially, thereby speeding up recovery.

It should be understood that the Summary of the Invention section is neither intended to identify key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become more readily understandable through the following detailed description with reference to the accompanying drawings. In the accompanying drawings, a plurality of embodiments of the present disclosure will be illustrated by way of example and not limitation, where

FIGS. 4A to 4F illustrate schematic diagrams of predicting priorities of files and data blocks in accordance with one or more embodiments disclosed herein.

DETAILED DESCRIPTION

Figure 1:
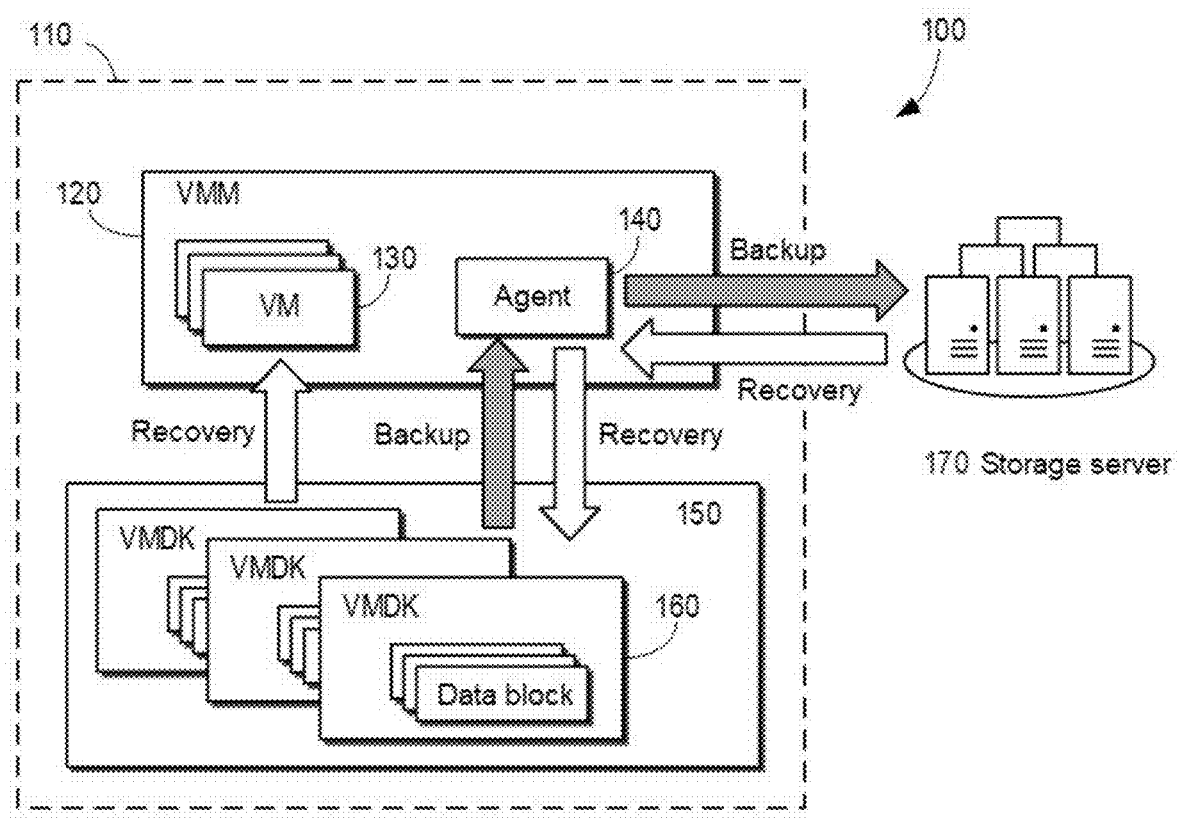
FIG. 1 illustrates a schematic diagram of an example computing system for backup and recovery in accordance with one or more embodiments disclosed herein.

The ideas of the present disclosure will now be illustrated with reference to various example embodiments shown in the accompanying drawings. It should be understood that these embodiments are described solely to enable those skilled in the art to better understand and further implement the present disclosure, and are not intended to limit the scope of the present disclosure in any way. It should be noted that similar or identical reference numerals may be used in the drawings where feasible, and that similar or identical reference numerals may indicate similar or identical elements. It will be understood by those skilled in the art that, from the description that follows, alternative embodiments of the structures and/or methods illustrated herein may be employed without departing from the principles and ideas of the present disclosure as described.

In the context of the present disclosure, the term "including" and its various variants may be understood as open-ended terms meaning "including but not limited to"; the term "based on" may be understood as "at least partially based on"; the term "an embodiment" may be understood as "at least one embodiment"; and the term "another embodiment" may be understood as "at least one other embodiment." Other terms that may appear but are not mentioned here, unless explicitly stated, should not be interpreted or limited in a manner that is contrary to the concept on which the embodiments of the present disclosure are based.

As described above, when backed-up data needs to be recovered from a data warehouse to restart a virtual machine and recover a service, since the volume of backup data is usually hundreds of gigabytes or even more, the time to recover the service is long, and the usual recovery time objective is as long as several hours or even days, which cannot meet business needs.

To solve or mitigate the above problem and/or other potential problems, the embodiments of the present disclosure propose a method for backup that can be implemented, for example, in a cloud computing device. The method includes: determining, based on attributes of at least one of one or more files included in data to be backed up, priorities of data blocks associated with the at least one file; and storing the data to be backed up and indications of the determined priorities of the data blocks to a second storage device (e.g., a remote data warehouse). In this way, it is possible to determine data blocks that are more important for recovery while backing up data, so that backup data can be recovered faster in future.

Accordingly, the embodiments of the present disclosure also propose a method for recovery that is implemented, for example, in a local cloud computing device. The method includes: receiving from a second storage device (e.g., a remote data warehouse) an indication of a first priority and an indication of a second priority that are related to data to be recovered, wherein the first priority is associated with a first set of data blocks, the second priority is associated with a second set of data blocks, and the first priority is higher than the second priority; and receiving, after the first set of data blocks is completely received, the second set of data blocks from the second storage device. In this way, it is possible to preferentially receive the data blocks that are more important for recovery when recovering backup data from the second storage device, thereby speeding up the recovery.

Basic principles and implementations of the present disclosure are illustrated below with reference to the drawings. It should be understood that example embodiments are provided only to enable those skilled in the art to better understand and then implement the embodiments of the present disclosure, and not to limit the scope of the present disclosure in any way.

FIG. 1 illustrates a schematic diagram of example computing system 100 for backup and recovery in accordance with one or more embodiments disclosed herein. As shown in FIG. 1, computing system 100 includes application server 110, wherein application server 110 may be a centralized or distributed physical computing device provided by a public or private cloud, on which several virtual machines (VMs) 130 providing services may run. For example, application server 110 may run virtual machine manager (VMM or Hypervisor) 120, wherein virtual machine manager 120 may control and schedule computing resources of several virtual machines 130 thereon. By using the virtualization technology, virtual machine manager 120 can provide, to guest operating systems of the virtual machines hosted thereon, virtual devices such as virtual processors, virtual memory, and virtual I/O devices (e.g., virtual disk devices).

In one or more embodiments, virtual machine manager 120 may be, for example, a bare computer-type virtual machine installed directly on a physical server, such as VMware® ESXi, or a host-type virtual machine manager installed on a host operating system, such as VMware® Workstation, or a combination of the above two, where a portion of the hardware resources is controlled directly by that virtual machine manager and a portion is controlled by a privileged operating system, such as Xen.

Virtual machine manager 120 may use, for example, containers to run several virtual machines 130 thereon, and virtual machines 130 run applications to provide services. In one or more embodiments, each virtual machine 130 may create its virtual disk device (e.g., with a virtual machine disk format (VMDK)) and store it to physical storage device 150 of application server 120. Virtual machine manager 120 also includes agent 140, wherein agent 140 is used to promote interaction between virtual machines 130 with components other than virtual machine manager 130 to implement and control functions such as network connection of virtual machines 130 and input/output (I/O) device access.

Storage device 150 may be centralized or distributed, and as shown, storage device 150 stores virtual machine file data associated with virtual machines 130, which is organized as, for example, virtual disk 160 in the VMDK format. Virtual disk 160 can manage, for example, creating, reading, writing, deleting, etc., files on the virtual disk via a virtual machine file system (VMFS). Typically, virtual disk 160 may represent a physical disk drive of the VMFS on the virtual machine, which may include all application data and configuration information related to the virtual machine per se. For example, virtual disk 160 may be mounted as an I/O device (for example, by a MOUNT command), so that virtual machine 130 can easily read, modify, add, delete, and save the content therein. As shown, virtual disk 160 may be a block device and includes multiple data blocks. Data block is the smallest unit for storing file data, and its size is typically, for example, 512 bytes or 4K bytes. It can be understood that in a file system, a file may be partitioned and stored into discrete data blocks, and an index of the file system may be used to find out which data blocks the file is partitioned and the data blocks to which the file is stored. According to one or more embodiments of the present disclosure, virtual disk 160 may include, but is not limited to, files related to virtual machine start, configuration files, application files (e.g., database files of Internet service providers), and the like.

As shown by dark-colored arrows in FIG. 1, when backing up data, agent 140 may read virtual disk 160 from storage device 150 in response to a backup command and send it (intact) to storage server 170. Storage server 170 may be a distributed high-capacity cloud storage infrastructure provided by a storage service provider and may back up the business data of the virtual machines on application server 110 on a regular or irregular basis. For example, a full backup of a certain virtual machine can be done once a week and then an incremental backup can be done once a day, so that more data can be stored with less space. In one or more embodiments, the logical data volume of a full backup may reach multiple terabytes (TBs), and the actual data volume backed up to storage server 170 even after de-duplication is at least several hundred GBs. The logical data volume of an incremental backup may reach tens or hundreds of GBs, and the actual data volume backed up to storage server 170 after de-duplication is at least tens of GBs.

When application server 110 is damaged, for example, when storage device 150 fails or is damaged for other reasons, in order to restart the service, agent 140 needs to receive the backed-up data from storage server 170 and save it to storage device 150. Virtual machine 130 can then read all data required for recovery from the mounted storage device 150 through an input/output (I/O) request so as to restart the service, as shown by the light-colored arrows in FIG. 1. In other words, for virtual machine 130, the recovery requires that all the backed-up data be transmitted and written to local storage device 150 before virtual machine 130 can be restarted. As described above, as the volume of backup data is as high as tens or hundreds of GBs, it is difficult to recover the service in a short period of time in the available bandwidth conditions, especially when application server 110 and storage server 170 are in remote communication, the time required to recover the service is longer.

Figure 2:
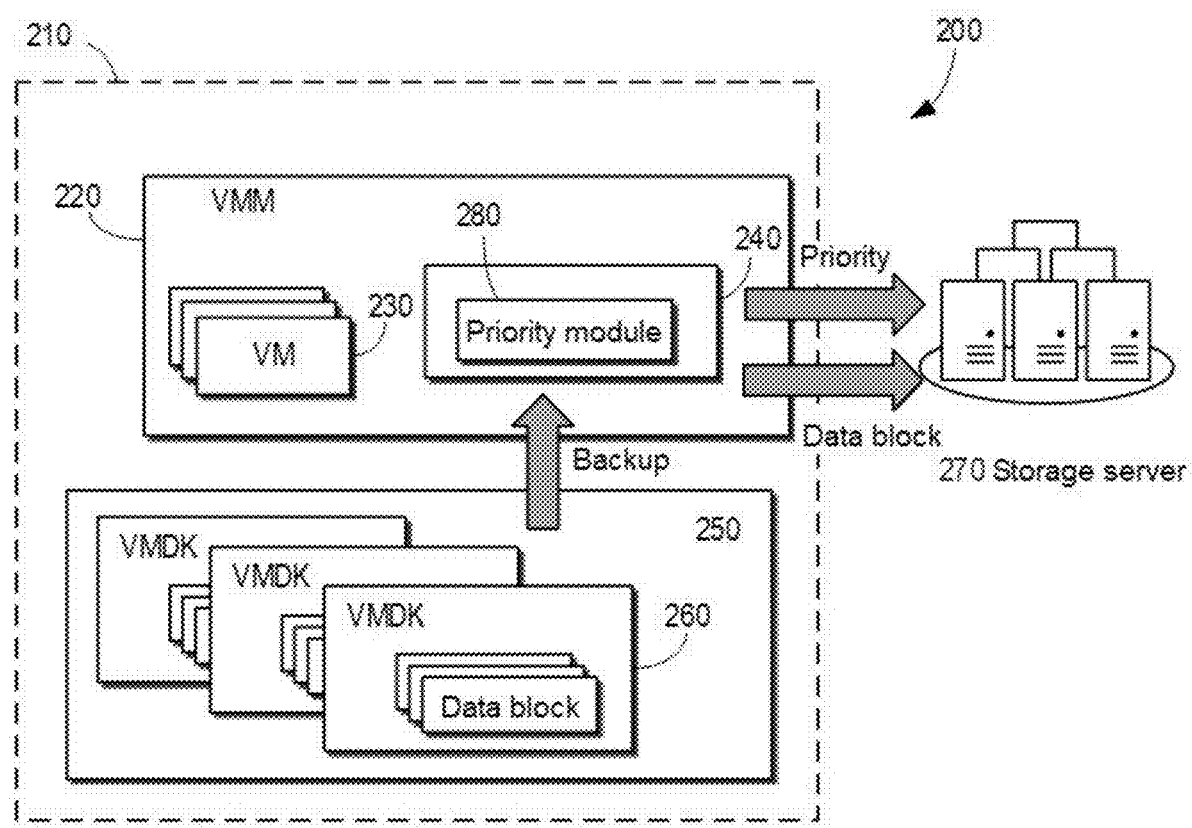
FIG. 2 illustrates a schematic diagram of a computing system for backup according to one or more embodiments of the present disclosure

FIG. 2 illustrates a schematic diagram of computing system 200 for backup according to one or more embodiments of the present disclosure. As shown, computing system 200 includes application server 210 and storage server 270, and similar to computing system 100 of FIG. 1, storage server 270 is adapted to receive backup data from application server 210. Virtual machine manager 220 may run several virtual machines 230 and include agent 240 for handling operations (such as network connection and input/output) of virtual machines 230. Agent 240 may receive virtual disk 260 to be backed up from storage device 250 of application server 210 in response to a backup request from virtual machine manager 220 or virtual machine 230. Virtual disk 260 includes multiple data blocks that are organized in the form of files through a file system. According to one or more embodiments of the present disclosure, agent 240 includes priority module 280, wherein priority module 280 may be implemented in agent 240 in the form of a plug-in, and when invoked and run, it is used to handle operations related to backup and recovery. For example, during backing up, agent 240 can mount the data to be backed up (e.g., all data in a certain virtual disk 260) that is related to virtual machine 230 as a block device, such as a virtual disk device, and then run priority module 280, wherein priority module 280 can generate, based on virtual disk 260 that is mounted as a block device, priority information for data blocks therein. The priority information can be sent along with virtual disk 260 to be backed up to storage server 270 for backup. The priority information can help in faster recovery of virtual machine 130, and more details on generating the priority information and using this priority information during recovery will be described in detail below.

Figure 3:
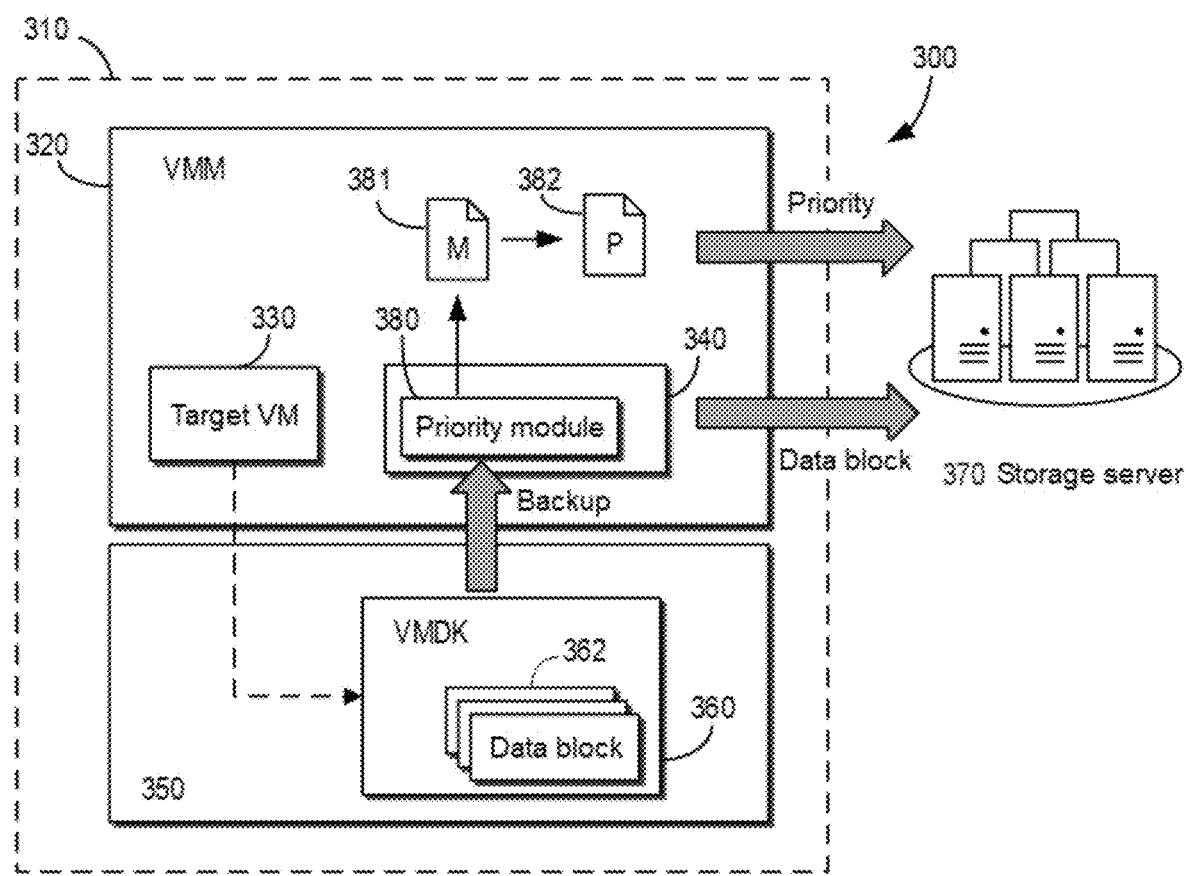
FIG. 3 illustrates a schematic diagram of a computing system for backup according to one or more embodiments of the present disclosure.

FIG. 3 illustrates a schematic diagram of computing system 300 for backup according to one or more embodiments of the present disclosure. As shown in FIG. 3, application server 310 runs virtual machine monitor 320 (e.g., VMware® ESXi), and certain virtual machine (also referred to as a target virtual machine) 330 on virtual machine monitor 320 needs to back up data. For example, target virtual machine 330 indicates that its virtual disk 360 needs to be backed up to storage server 370. In one or more embodiments, virtual disk 360 may have a virtual machine disk format (VMDK), but is not limited thereto. Additionally, the types of files in virtual disk 360 include, but are not limited to: virtual machine configuration files (VMX), virtual machine snapshot files (VMSD), .NVRAM files, VMX.LCK files, VMWARE.LOG, and so on, and these files are stored as data blocks 362 in virtual disk 360. In one or more embodiments, virtual disk 360 may include a virtual machine file system (VM FileSystem, VFS for short), and additionally or alternatively, virtual machine file 360 may include other file systems, for example, NTFS, FAT, CDFS, exFAT, Ext2, Ext3, Ext4, HFS+, and so on. Similarly, via the file system, files in the virtual disk are organized into data blocks 362. In one or more embodiments, the file system records offset addresses of several data blocks associated with each file. Through the file system, storage locations of all files in virtual disk 360 and of data blocks 362 associated with each file can be determined.

According to one or more embodiments of the present disclosure, in order to transmit and back up virtual disk 360 to storage server 370, agent 340 can mount virtual disk 360 as a block device, such as a virtual disk device, and can then invoke and run priority module 380. Priority module 380 can use the file system of virtual disk 360 to generate metadata file 381 (M) of all the files of virtual disk 360. Metadata file 381 records attributes (also referred to as metadata) of the files of virtual disk 360.

In one or more embodiments, the file system of virtual disk 360 may include an index node (inode) related to each file, wherein the index node may include attributes of the file, for example, a size of the file, an owner ID of the file, reading, writing, and executing permissions to access the file, time stamps of the file (including the last change time of the index node, the last change time of the file content, and the last access time of the file), locations of data blocks for the file, the number of blocks, an I/O block size, the device number, and so on. Priority module 380 can use at least a part of the attributes of the index nodes in the file system to generate metadata file 381, and can then predict the priorities of data blocks 362 in virtual disk 360 based on metadata file 381. The predicted priorities can be recorded to priority file 382, which can be sent along with virtual machine file 360 to storage server 370 for backup, as shown by the dark-colored arrows in FIG. 3. In one or more embodiments, priorities of associated data blocks can be generated only for some files in virtual disk 360, without generating priorities for all files.

According to one or more embodiments of the present disclosure, when recovering target virtual machine 330, application server 320 may receive, by parsing its priority file 382, data blocks with high priorities from storage server

370 earlier. Therefore, it is not necessary to wait for all data blocks to be received before starting to recover virtual machine 330. In other words, when restarting target virtual machine 330 on application server 310, data blocks of high importance are preferentially transmitted and stored back to local storage device 350 of application server 310, so that target virtual machine 330 can acquire these data blocks in time to recover the service faster. According to one or more embodiments of the present disclosure, the priority of a data block can be predicted by predicting the priority of a file. More details of predicting priorities of files and data blocks will be described below.

Figure 4E:
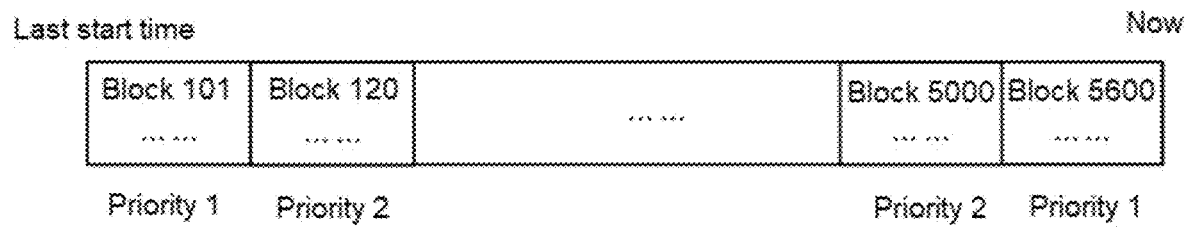

FIGS. 4A to 4F illustrate schematic diagrams of predicting priorities of files and data blocks. According to one or more embodiments of the present disclosure, the last start time of target virtual machine 330 can be acquired by executing a command of the virtual machine (for example, a command in the virtual machine toolbox VMtools), and the time range from the last start time to now can be obtained, as shown in FIG. 4A. This time range can then be divided into multiple intervals, each of which can be fixed (e.g., 30 minutes) and uniform in length or can also have a variable length that can be dynamically adjusted. As shown in FIG. 4B, the time range is divided into several intervals according to the length of 30 minutes. Next, a priority can be assigned to each interval. As shown in FIG. 4C, higher priorities can be assigned to intervals located at two ends of the time range. For example, priority 1 is assigned to the leftmost and rightmost intervals of the time range, priority 2 to the second interval from the left and the second interval from the right, priority 3 to the third interval from the left and the third interval from the right, and so on. According to one or more embodiments of the present disclosure, time intervals closer to the last start time or the current time are assigned higher priorities, because when recovering the virtual machine, the behavior of the virtual machine and the files it operates near the initial start time and backup time of the virtual machine can be predicted to be more important.

Next, priority module 380 can obtain attributes of the files by accessing file system 361 of virtual machine file 360. As described above, attributes of a file may include a size of the file, an owner ID of the file, reading, writing, and executing permissions to access the file, time stamps of the file (including the last change time of an index node, the last change time of file content, and the last access time of the file), locations (e.g., offset addresses) of data blocks for the file, the number of blocks, an I/O block size, the device number, and so on. In one or more embodiments, one or more of the above attributes may be used to assign a priority to a file. For example, a time stamp of a file and, more particularly, the last access time of the file can be used to assign a priority to the file. As a result, the last access time of the files can be mapped to the various intervals of the time range described with reference to FIG. 4C, and priorities of the corresponding intervals may be used as the priorities of the files. For example, as shown in FIG. 4D, file Kem.log is accessed during the first interval (the first 30 minutes) after the start of the virtual machine, and then file Kem.log can be assigned priority 1, whereas file Libc.so is accessed during the second interval (from 30 minutes to 60 minutes) after the start of the virtual machine, and then file Libc.so can be assigned priority 2. Similarly, corresponding to intervals close to the current time, file App.journal can be assigned priority 1, file App.dat can be assigned priority 2, and so on.

According to one or more embodiments of the present disclosure, priorities can be assigned to all files in all virtual machine files 360, and alternatively, priorities can be assigned only to those files that fall within part of the priority intervals (e.g., priority 1 and priority 2) to reduce the computational load during backup. Priority module 380 can generate metadata file 381 based on attributes of the files obtained from file system 361, wherein metadata file 381 may include part or all of the attributes of the aforementioned files. For example, metadata file 381 may include the file name, path, last access time, last change time of the file content, last access time of the file, and so on, of each file in virtual disk 360, and metadata file 381 may also be generated as a searchable file type, e.g., an SQLite DB data block type file, making it possible to simply search and filter metadata file 381 to acquire the files that need to be assigned priorities. For example, referring to the time range and priority examples illustrated in FIG. 4C, if it is necessary to search for files that are assigned priority 1 and priority 2, the files of which the last access time is within the first hour after the start time of virtual machine 330 and the last access time is within one hour before the backup time can be searched. While embodiments of the present disclosure describe assigning a priority to a file based on the last access time of the file, it should be understood that the priority can also be assigned to a file based on one or more other attributes of the file.

Next, priorities of files need to be mapped to priorities of data blocks. It should be understood that files are stored on a disk or any other non-volatile storage device. For disks, the smallest storage unit is referred to as a "sector." Each sector stores 512 bytes of data. When a file is accessed, multiple consecutive sectors, i.e., "a block," will be read. For example, a block may consist of eight consecutive sectors (usually 4 KB). As described above, index nodes of a file system also store a correspondence between files and their data blocks, i.e., locations (also referred to as offsets or offset addresses) of the data blocks in the virtual disk. By invoking a system command (for example, a Linux command debugfs), priority module 380 can access the index nodes to obtain the locations of data blocks for a file. In some cases, a file is stored into multiple data blocks, so it is possible to acquire the locations of these data. For example, using the Linux command debugfs -r "stat/path/to/file"/dev/sdxxx, locations of the data blocks of the following example file can be obtained:

(0-2047): 600064-602111,
(2048-6143): 618496-622591,
(6144-8191): 624640-626687,
. . .
(18432-20210): 742952-744730

The range of numbers located in parentheses in the figure indicates logical addresses of the data blocks for the example file, and located on the right side are offset addresses of the corresponding data blocks in virtual file 360 (for virtual machine 330, the offset addresses are not necessarily the physical addresses in the physical storage device). Further, a priority that has been assigned to a file can be assigned to a data block for that file. Therefore, a mapping from priorities of files to priorities of data blocks is achieved. For example, referring to FIG. 4E, a schematic diagram of data blocks to which priorities are assigned is shown, where block 101 may be a data block for a file having priority 1, block 120 may be a data block for a file having priority 2, and so on. It should be noted that although the present disclosure uses a disk or virtual disk as an example specific implementation of storage device 350, it should be understood that other types of non-volatile storage devices may also be used as storage device 350.

Figure 4F:
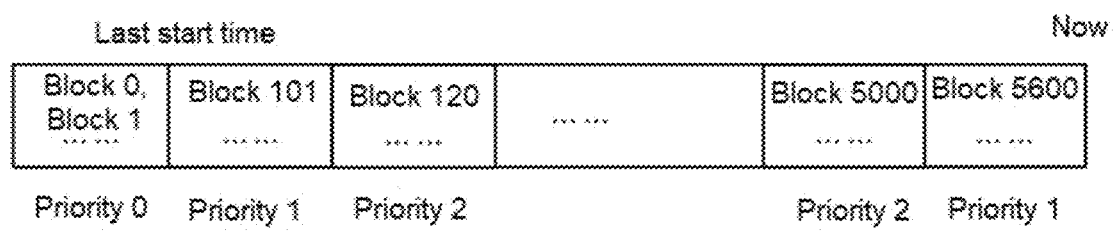

In addition to assigning a priority to a file and its data blocks based on the time range and access time, the priority can also be assigned based on other attributes such as the type and path of the file or data blocks per se. In one or more embodiments, files such as scripts, configuration files, and kernels that are necessary for boot and start of virtual machine 330 and their data blocks may be assigned the highest priority, such as priority 0. According to one or more embodiments of the present disclosure, partition information data blocks, such as master boot record (MBR) and global unique identification disk partition table (GPT) data blocks can be assigned the highest priority. In addition, files in the boot partition, for example, Grub.cfg, grubenv, vmlinuz-*, initrd.img-*, and other files, can also be assigned the highest priority (and accordingly, their data blocks also have the highest priority). Additionally, it is possible to specify that files under certain paths are assigned the highest priority. For example, in a Linux environment, it is possible to specify that files under the/etc directory are assigned the highest priority. Thus, in a similar manner, priority module 380 can obtain priorities of some or all of the data blocks in virtual disk 360, and FIG. 4F illustrates a schematic diagram of priorities of data blocks according to one or more embodiments of the present disclosure, which include data blocks having the highest priority (priority 0).

Returning to FIG. 3, according to one or more embodiments of the present disclosure, priority module 380 can generate priority file 382 for recording the resulting indications regarding priorities of the data blocks. Priority file 382 can record the indication of each priority and the locations of its corresponding data blocks by means of a table or in any other manner. In one or more embodiments, the indication of a priority and the offset addresses of data blocks associated with it are stored in a table form in priority file 382. Priority file 382 can then be transmitted to storage server 370 along with virtual disk 360. When it is necessary to restart target virtual machine 330 and recover the service, priority file 382 can first be transmitted back to application server 310 and parsed, in order for speeding up the recovery of target virtual machine 330. The process will be described in detail below.

Although numbers such as priorities 0, 1, and 2 are used herein to indicate the priorities of files and data blocks, where smaller numbers indicate higher priorities and priority 0 indicates the highest priority, these numbers and their size relationships are only examples and not limitations. It should be understood that any number of letters, symbols, numbers (individually or in combination) can be used to indicate priorities and the relationship between them.

Figure 5:
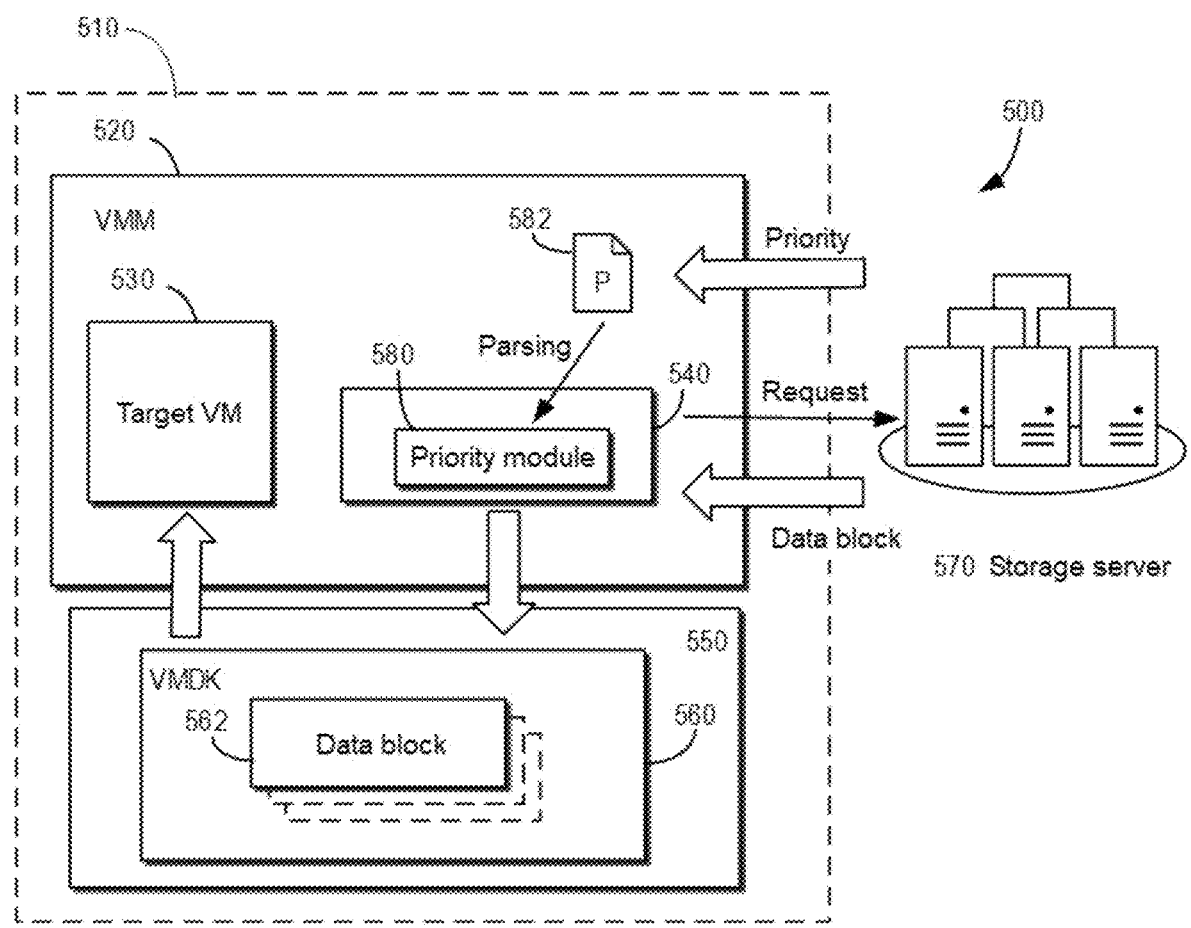
FIG. 5 illustrates a schematic diagram of a computing system for recovery according to one or more embodiments of the present disclosure.

FIG. 5 illustrates a schematic diagram of computing system 500 for recovery according to one or more embodiments of the present disclosure. Computing system 500 includes application server 510 and storage server 570 that stores backup data of application server 510. Application server 510 includes virtual machine manager 520 and storage device 550. Several virtual machines can be run on virtual machine manager 520, and when it is necessary to restart virtual machine 530 (referred to as a target virtual machine) due to a failure of storage device 550 or for any other reason, target virtual machine 530 can be restarted by recovering backup data from storage server 570. Virtual machine manager 520 also includes agent 540, wherein agent 540 is adapted to interact with components external to virtual machine manager 520 for network communication of the virtual machine and input/output device access. Storage device 550 may be any non-volatile storage device capable of persistently storing data related to a virtual machine manager and a virtual machine, for example, a virtual disk (such as a virtual disk file format in VMDK format).

During recovery, target virtual machine 530 can restart the virtual machine and recover the service by loading data blocks 562 in storage device 550. In order to faster recover target virtual machine 530 from storage server 570, priority module 580 is configured in agent 540. In response to a command to recover target virtual machine 530, priority module 580 can receive and parse corresponding priority file 582 from storage server 570. As described above, priority file 582 records, in a table form, indications of priorities of data blocks in backup data and offset addresses of associated data blocks. The indication of a priority indicates the priority of recovering a data block from storage server 570 to storage device 550 in application server 510. In other words, agent 540 first receives data blocks with higher priorities from storage server 570. Once receiving the data blocks from storage server 570, agent 540 can store these data blocks 562 to storage device 550. As shown, data block 562 drawn in a solid box indicates a data block that has been transmitted and stored, and data blocks 562 drawn in dashed boxes indicate data blocks that have not yet been transmitted and stored. Target virtual machine 530 can then read stored data blocks 562 from storage device 550 to recover the service. For example, priority module 580 can first obtain, by parsing, from priority file 582 offset addresses of a set of data blocks with priority 0 (the highest priority), i.e., storage locations of those data blocks, and then use those offset addresses to request all data blocks with priority 0 from storage server 570. As described above, data blocks with priority 0 may include partition information data blocks, data blocks for files in the boot partition, and other specified data blocks. After acquiring and storing all data blocks with priority 0 from storage server 570, agent 540 can further request a second set of data blocks with priority 1, a third set of data blocks with priority 2, and so on, from storage server 570. In this way, data blocks of backup data that are more important for recovery of the service can be recovered preferentially in order to faster restart virtual machines and recover the service.

It should be understood that there is no limit to the number of data blocks associated with any priority, which may be one or more, or even zero, in which case it is possible to skip parsing the offset addresses of data blocks of the corresponding priority.

Furthermore, in some cases, although data blocks with high priorities are acquired earlier from storage server 570 via priority module 580, during the recovery of the service, the target virtual machine may need data blocks that have not yet been recovered to storage device 550. In this case, target virtual machine 530 can request these data blocks from agent 540, and agent 540 in turn requests these data blocks from storage server 570. This request has a higher priority compared to the currently transmitted data blocks so as to acquire the data blocks from storage server 570 as early as possible to meet the needs of target virtual machine 530. In other words, agent 540 can receive a request regarding data blocks from target virtual machine 530, insert it to the front of a priority-based data block transmission queue, and after acquiring the data blocks requested by target virtual machine 530, send them directly to the target virtual machine and store them to storage device 550. After completing the above operations, agent 580 continues to receive data blocks from storage server 570 in accordance with the indications provided in priority file 582 regarding the priorities of the data blocks, and store them to storage device 550.

Figure 6:
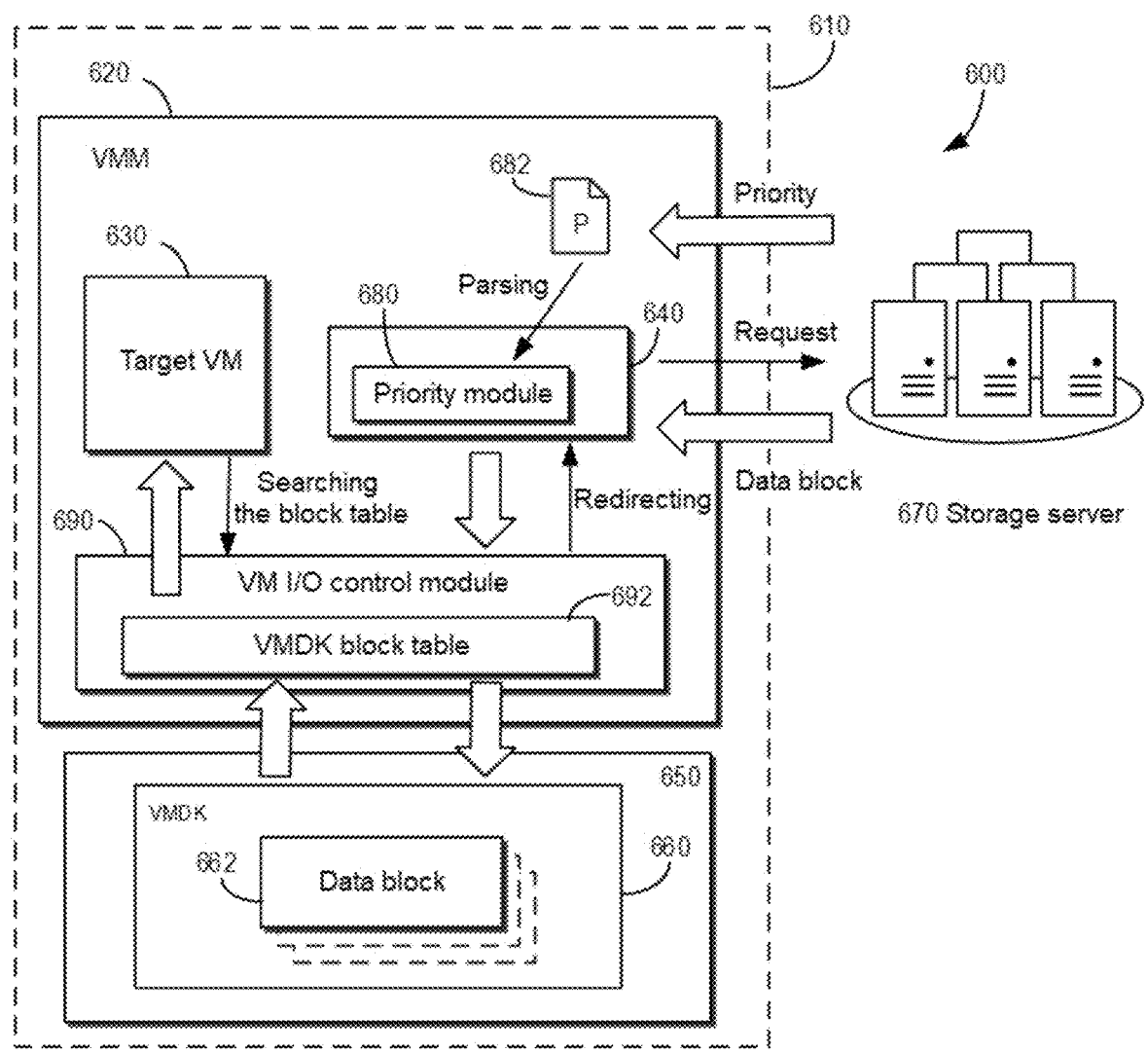
FIG. 6 illustrates a schematic diagram of a computing system for recovery according to one or more embodiments of the present disclosure.

FIG. 6 illustrates a schematic diagram of computing system 600 for recovery according to one or more embodiments of the present disclosure. Compared with FIG. 5, computing system 600 further includes virtual machine input/output (VM I/O) control module 690. Virtual machine I/O control module 690 can be used to filter I/O requests from virtual machines for virtual disks to reduce additional I/O overhead. In one or more embodiments, I/O requests generated by virtual machine 630 need to be processed by virtual machine I/O control module 690 before they can be presented to an I/O device, such as storage device 650.

According to one or more embodiments of the present disclosure, the process of receiving data blocks from storage server 670 and storing them to storage device 650 by priority module 680 using priority file 682 from storage server 670 and according to indications of priorities of data blocks recorded in priority file 682 is similar to the process described with reference to FIG. 5. In the example shown in FIG. 6, target virtual machine 630 to be recovered can acquire the required data blocks with the help of virtual machine I/O control module 690. Virtual machine I/O control module 690 can create and store block table 692 regarding virtual disk 660, and block table 692 is used to store index information about data blocks that have been stored in storage device 650 (including, but not limited to, the offset addresses of the data blocks on the virtual disk or their hashes, the identification of the data blocks, the hashes of the data blocks, and so on). That is, block table 692 records information on which data blocks have been recovered locally from storage server 570. By using block table 692, target virtual machine 530 can search whether the requested data blocks are included in storage device 650 before an I/O request is sent to storage device 650, thereby avoiding an invalid I/O request for storage device 650 when storage device 650 does not have the requested data blocks.

According to one or more embodiments of the present disclosure, when target virtual machine 630 is started, block table 692 can be initialized to be empty. Target virtual machine 630 then reads data blocks from virtual disk 660 of storage device 650 via block table 692 of virtual machine I/O control module 690, and this process will be described in detail below.

First, agent 640 can execute priority module 580 in response to target virtual machine 530 being about to be started, receive priority file 682 related to the virtual disk of target virtual machine 630 from storage server 670, and parse priority file 682. Priority file 682 records indications of priorities of data blocks in the backup data, and the indication of a priority indicates the priority of recovering a data block from storage server 670 to storage device 650 in application server 610. In other words, agent 640 will first receive data blocks with higher priorities from storage server 670. Once receiving the data blocks from storage server 670, agent 640 records index information for these data blocks 662 in block table 692 via virtual machine I/O control module 690 and stores data blocks 662 to storage device 650. As shown, data block 662 in a solid box is used to indicate a data block that has been transmitted and stored, and data blocks 662 in dashed boxes are used to indicate data blocks that have not yet been transmitted and stored.

At the same time, target virtual machine 630 can generate an I/O request for data blocks in storage device 650 and send the I/O request to virtual machine I/O control module 690. Then, virtual machine I/O control module 690 processes this I/O request by searching block table 692. If the data blocks are found through searching in block table 692, i.e., the data blocks have been recovered and stored to storage device 650 located locally on application server 610, the data blocks can be read from storage device 650; conversely, if the data blocks are not found through searching in block table 692, virtual machine I/O control module 690 can redirect the I/O request to agent 640, and agent 640 then requests the data blocks from storage server 670. According to one or more embodiments of the present disclosure, the I/O request can be inserted to the front of a priority-based data block transmission queue to acquire the data blocks from storage server 670 as early as possible. Similarly, after the data for the I/O request is received by agent 640, the index information for the data blocks is recorded in the block table of virtual machine I/O control module 690 to update block table 692. The data blocks for the I/O request can be sent directly from agent 640 to target virtual machine 630, or may be acquired by target virtual machine 630 by an I/O request again after being stored to storage device 650.

Figure 7:
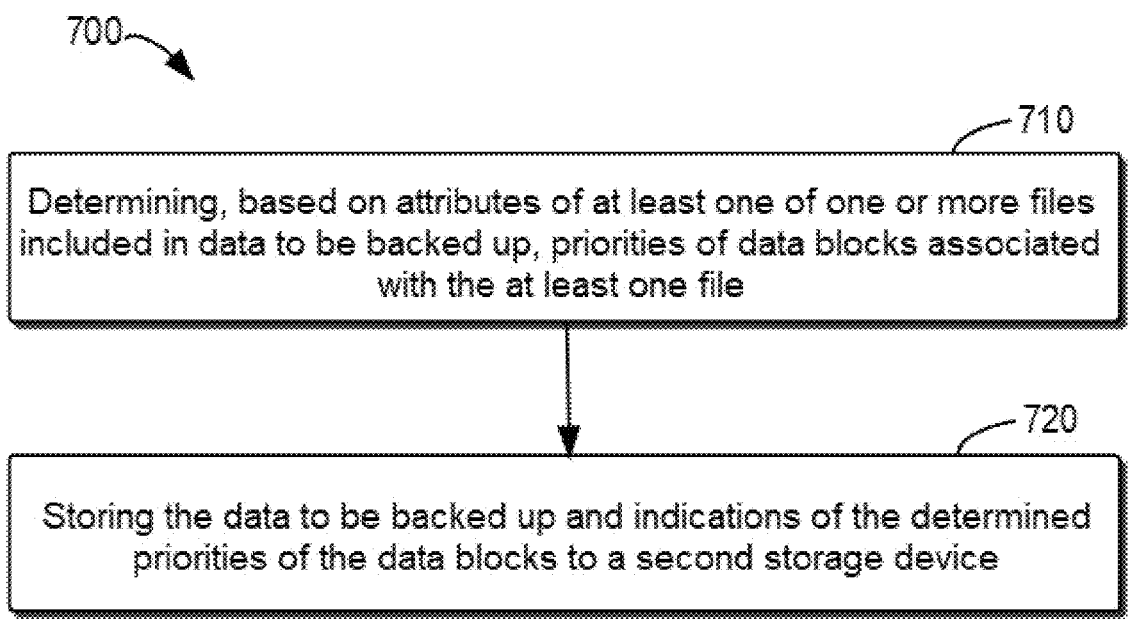
FIG. 7 illustrates a schematic flowchart of a method for backup according to one or more embodiments of the present disclosure.

FIG. 7 illustrates a schematic flowchart of method 700 for backup according to one or more embodiments of the present disclosure. Method 700 can be implemented by, for example, a cloud computing device, for backing up data from a first storage device to a second storage device. The first storage device may be a non-volatile storage device (such as a disk, a solid state drive, and an SD card) and may be an input/output (I/O) device of a computing device as described above, such as any of storage devices 150, 250, 350, 550, and 650. The second storage device may be, for example, a distributed high-capacity cloud storage infrastructure or data warehouse provided by a storage service provider, such as any of storage servers 170, 270, 370, 570, and 670.

Method 700 includes, in step 710, determining, based on attributes of at least one of one or more files included in data to be backed up, priorities of data blocks associated with the at least one file; and in step 720, storing the data to be backed up and indications of the determined priorities of the data blocks to a second storage device.

With method 700, it is possible to determine data blocks that are more important for recovery while backing up data, so that backup data can be recovered faster in future.

In one or more embodiments, the data to be backed up may be included in a virtual machine disk device. For example, the data to be backed up can be stored in the VMDK format so that data therein can be read and written in data blocks, where each data block has its own location or offset address. In one or more embodiments, method 700 may further include: generating a metadata file including the attributes of the at least one file using a file system of the virtual disk device. As described above, the metadata records the attributes of a file in the virtual disk device, such as the size of the file, the owner ID of the file, the reading, writing, and executing permissions to access the file, the time stamps of the file (including the last change time of the index node, the last change time of the file contents, and the last access time of the file), the locations of data blocks for the file, the number of blocks, the I/O block size, the device number, and so on.

These attributes can be used to determine priorities of the file and the associated data blocks. In one or more embodiments, the attributes include an accessed time of the at least one file, and determining the priorities of the data blocks associated with the at least one file may include: determining a start time of a machine where the data to be backed up is located and a current time; and if it is determined that a first accessed time of a first file associated with a first data block is closer to the start time than a second accessed time of a second file associated with a second data block, or if it is determined that the first accessed time is closer to the current time than the second accessed time, determining that the first data block has a higher priority than that of the second data block. When the accessed time of a file is close to the start time of the virtual machine or the current time, it indicates that the file has a high importance. Therefore, the data blocks for that file can be assigned a high priority.

The entire time interval from the start time to the current time can be divided into multiple intervals to determine the importance of the file and its data blocks. In one or more embodiments, determining the priorities of the data blocks associated with the at least one file may include: dividing time from the start time to the current time into multiple time intervals, determining that the first accessed time is within a first time interval and the second accessed time is within a second time interval; and if it is determined that the first time interval is closer to the start time than the second time interval, or if it is determined that the first time interval is closer to the start time than the second time interval, determining that the first data block has a higher priority than that of the second data block. By dividing the time interval into multiple discrete intervals, it is helpful to assign corresponding priorities to files. For example, the priorities can be made to correspond to these time intervals, and the time intervals can be used as the priorities of the files.

In addition to determining the priority of a file by considering the accessed file of the file, the priority of the file can also be determined according to the attributes of the file, such as the type or the storage location. In one or more embodiments, determining the priorities of the data blocks associated with the at least one file may include: if it is determined that a third data block is associated with a start file of a machine where the data to be backed up is located, setting a priority of the third data block to the highest priority. In other words, if a data block is a data block for the start file, the highest priority is given to recovering that data block to speed up the recovery of the virtual machine.

After the priority of the data block is determined, the indication of this priority is saved to the second storage device. In one or more embodiments, storing the indications of the priorities of the data blocks to the second storage device may include: storing the indications of the priorities of the data blocks and offset addresses of the data blocks in an associated manner to the second storage device. As a result, the storage locations of data blocks can be obtained by parsing the indications of the priorities, so that these blocks can be requested when recovering backup data.

In one or more embodiments, the indications of the priorities and the offset addresses are stored in a table form. The table can be stored as a searchable database file, thus facilitating efficient parsing.

Figure 8:
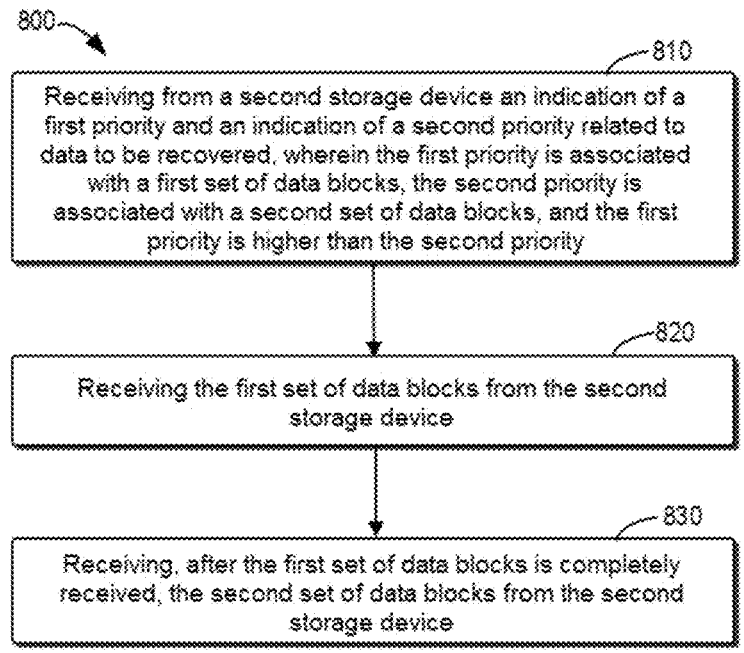
FIG. 8 illustrates a schematic flowchart of a method for recovery according to one or more embodiments of the present disclosure.

FIG. 8 illustrates a schematic flowchart of method 800 for recovery according to one or more embodiments of the present disclosure. Method 800 may be implemented by, for example, a cloud computing device, for recovering backed-up data from a second storage device to a first storage device to recover the service in the event of, for example, a failure of the cloud computing device. The first storage device may be a non-volatile storage device (such as a disk, a solid state drive, and an SD card) and may be an input/output (I/O) device of a cloud computing device as described above, such as any of storage devices 150, 250, 350, 550, and 650. The second storage device may be, for example, a distributed high-capacity cloud storage infrastructure or data warehouse provided by a storage service provider, such as any of storage servers 170, 270, 370, 570, and 670.

Method 800 includes, in step 810, receiving from a second storage device an indication of a first priority and an indication of a second priority that are related to data to be recovered, wherein the first priority is associated with a first set of data blocks, the second priority is associated with a second set of data blocks, and the first priority is higher than the second priority. It should be understood that the first set of data blocks may include one or more data blocks and the second set of data blocks may also include one or more data blocks, and there is no limit to the number of data blocks in each set of data blocks. Method 800 further includes, in step 820, receiving the first set of data blocks from the second storage device. Method 800 further includes, in step 830, receiving, after the first set of data blocks is completely received, the second set of data blocks from the second storage device.

According to method 800, it is possible to receive preferentially data blocks that are more important, e.g., with higher priorities, for recovery when recovering backup data from the second storage device, thereby speeding up the recovery.

In step 810, indications of priorities of data blocks can be acquired by receiving a priority file from the second storage device and parsing the priority file. The priority file may include the priorities of the data blocks as shown with reference to FIG. 4F, for example, the indication of the first priority is 0 and the associated data blocks include block 0, block 1, etc., and the indication of the second priority is 1 and the associated data blocks include block 101, block 5000, etc. For another example, referring to the priorities of data blocks shown in FIG. 4F, block 0 and block 1 with the highest priority 0 (the most important data blocks containing partition information and start configuration files, as described above) are first received from the second storage device, and then block 101, block 5600, etc., with priority 1 are received, wherein although these data blocks are not as important as block 0 and block 1, they may be urgently needed for recovery of the service and are usually accessed early after the start of the virtual machine or accessed before backup, and so on. As a result, the data that needs to be recovered can be received from the second storage device in a descending order of priority or importance to speed up recovery.

In one or more embodiments, method 800 may further include: determining a first set of offset addresses of the first set of data blocks, and requesting the first set of data blocks from the second storage device using the first set of offset addresses; and similarly, determining a second set of offset addresses of the second set of data blocks, and requesting the second set of data blocks from the second storage device using the second set of offset addresses. For example, the priority file as described above may include indications of priorities and offset addresses of corresponding data blocks that are stored in a table form, and the indications of priorities may be used to find through searching offset addresses of associated data blocks from the priority file. Furthermore, these offset addresses can be included in a recovery request and sent to the second storage device. In response, the requested data blocks are received from the second storage device.

The received data blocks will be stored locally, for example, in the first storage device. The first storage device may be a non-volatile storage device, such as a magnetic disk, a solid state drive, an SD card, and so on. The started virtual machine can access the data blocks stored in the first storage device through an input/output (I/O) request to recover the service.

In one or more embodiments, method 800 may further include: storing, in the first storage device, data blocks received from the second storage device; and recording the stored data blocks in a data block table in the first storage device. By recording the stored data blocks in the data block table, accesses to the first storage device can be controlled or filtered, thereby improving the performance of the cloud computing device.

In one or more embodiments, method 800 may further include: determining a data block to be read; and accessing the data block from the first storage device if the data block is recorded in the data block table; otherwise, requesting the data block from the second storage device. By using the data block table, it is possible to determine whether a requested data block is included in the first storage device before an access request for the first storage device is sent to the first storage device, thereby avoiding an invalid request for the first storage device if the first storage device does not have the requested data block.

Figure 9:
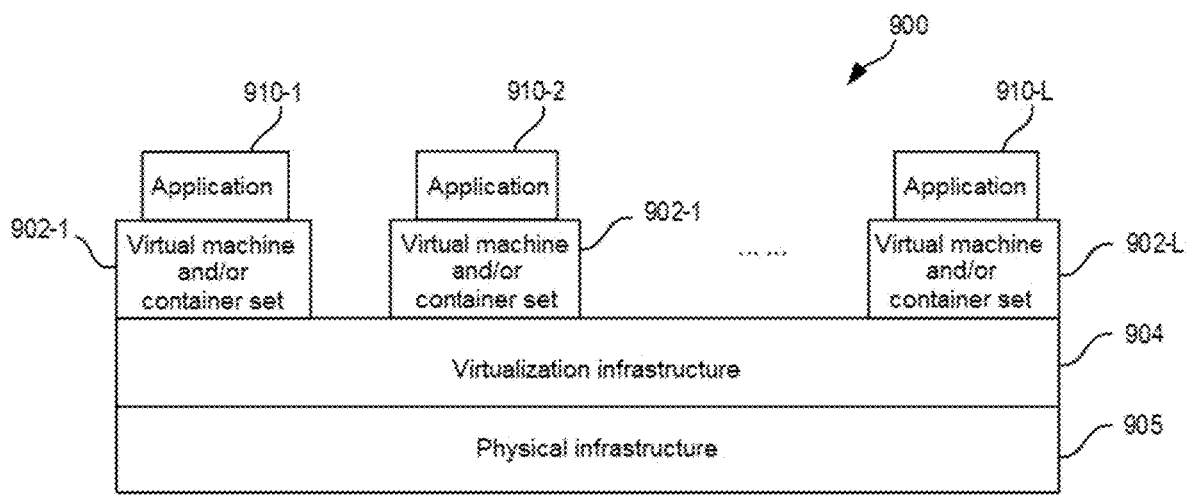
FIG. 9 illustrates an example processing platform including a cloud infrastructure according to one or more embodiments of the present disclosure.

FIG. 9 illustrates an example processing platform including cloud infrastructure 900 according to one or more embodiments of the present disclosure. Cloud infrastructure 900 includes a combination of physical and virtual processing resources, which can be used to implement any of computing systems 100-300 and 500-600 as described in the embodiments of the present disclosure. Cloud infrastructure 900 includes multiple virtual machine (VM) and/or container sets 902-1, 902-2 . . . and 902-L implemented using virtualization infrastructure 904. Virtualization infrastructure 904 runs on physical infrastructure 905 and may include one or more virtual machine managers and/or operating system-level virtualization infrastructures. The operating system-level virtualization infrastructures may include kernel control sets for Linux operating systems or other types of operating systems.

Cloud infrastructure 900 also includes a set of applications 910-1, 910-2 . . . and 910-L. These applications run, under the control of virtualization infrastructure 604, on corresponding VM/container sets of VM/container sets 902-1, 902-2 . . . and 902-L. Virtual machine/container set 902 may include respective VMs, respective container sets including one or more containers, or respective one or more container sets running in VMs.

In one or more implementations shown in FIG. 9, VM/container set 902 may include corresponding VMs implemented using virtualization infrastructure 604 that includes at least one virtual machine manager. An example of the virtual machine platform that can be used to implement virtual machine managers within virtualization infrastructure 604 is VMware® vSphere®, which may have an associated virtual infrastructure management system, for example, VMware® vCenter®. The underlying physical machine may include one or more distributed processing platforms that include one or more storage systems.

In the embodiments shown in FIG. 9, VM/container set 902 may include corresponding containers implemented using virtualization infrastructure 604, wherein virtualization infrastructure 604 provides operating system-level virtualization functions, such as supports for Docker containers running on bare computer hosts or Docker containers running on VMs. Various kernel control sets of the operating system are used to implement the containers for illustrative purposes.

Figure 10:
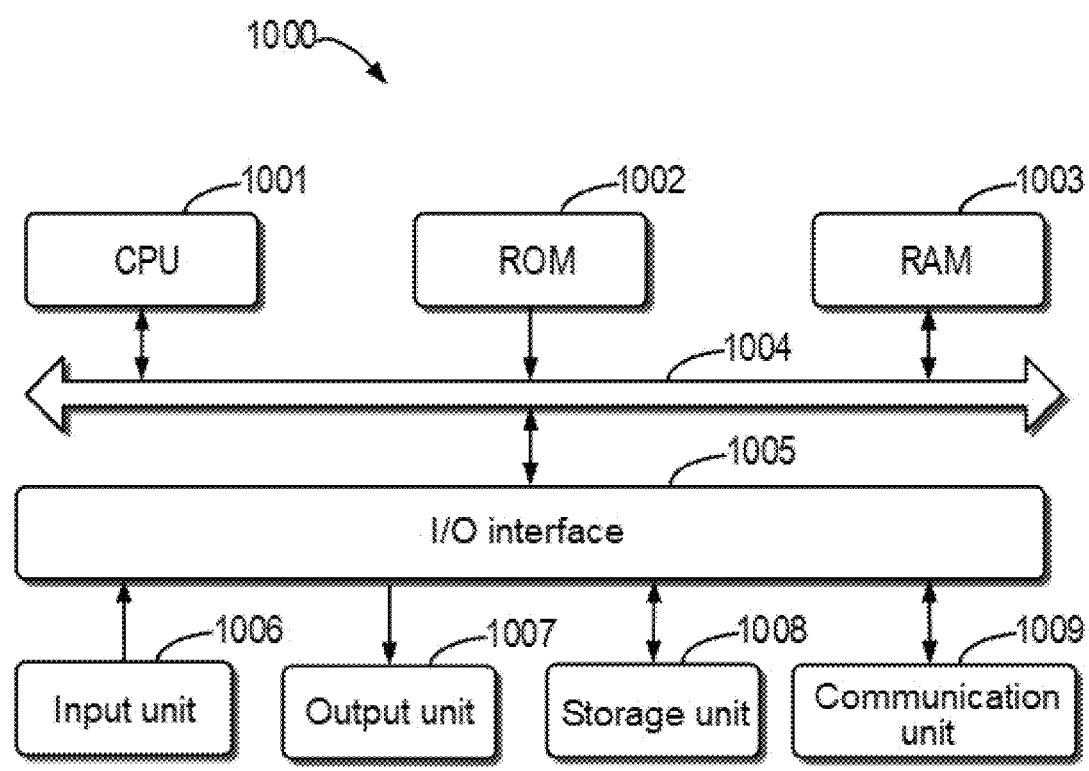
FIG. 10 illustrates a schematic block diagram of a device that can be used to implement one or more embodiments of the present disclosure.

FIG. 10 illustrates a schematic block diagram of device 1000 that can be used to implement one or more embodiments of the present disclosure. Device 1000 can be used to implement application servers 100-300 and 500-600 described above with reference to the accompanying drawings. As shown in the figure, device 1000 includes central processing unit (CPU) 1001 that may perform various appropriate actions and processing according to computer program instructions stored in read-only memory (ROM) 1002 or computer program instructions loaded from storage unit 1008 into random access memory (RAM) 1003. In RAM 1003, various programs and data required for the operation of device 1000 may also be stored. CPU 1001, ROM 1002, and RAM 1003 are connected to each other through bus 1004. Input/output (I/O) interface 1005 is also connected to bus 1004.

Multiple components in device 1000 are connected to I/O interface 1005, including: input unit 1006, such as a keyboard or a mouse; output unit 1007, such as various types of displays or speakers; storage unit 1008, such as a magnetic disk or an optical disk; and communication unit 1009, such as a network card, a modem, or a wireless communication transceiver. Communication unit 1009 allows device 1000 to exchange information/data with other devices via a computer network such as the Internet and/or various telecommunication networks.

The methods or processes described above may be executed by processing unit 1001. For example, in one or more embodiments, the method may be implemented as a computer software program that is tangibly included in a machine-readable medium, such as storage unit 1008. In one or more embodiments, part or all of the computer program may be loaded into and/or installed onto device 1000 via ROM 1002 and/or communication unit 1009. When the computer program is loaded into RAM 1003 and executed by CPU 1001, one or more steps or actions of the methods or processes described above may be performed.

In one or more embodiments, the methods and processes described above may be implemented as computer program products. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagated through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, as well as conventional procedural programming languages. The computer-readable program instructions may be executed entirely on a user's computer, partly on a user's computer, as a stand-alone software package, partly on a user's computer and partly on a remote computer, or entirely on a remote computer or server. In a case where a remote computer is involved, the remote computer can be connected to a user computer through any kind of networks, including a local area network (LAN) or a wide area network (WAN), or can be connected to an external computer (for example, connected through the Internet using an Internet service provider). In one or more embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

These computer-readable program instructions can be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the devices, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A method for backup, including:
determining, based on attributes of at least one of one or more files included in data to be backed up, priorities of data blocks associated with the at least one file; and
storing the data to be backed up and indications of the determined priorities of the data blocks to a second storage device, wherein storing the indications of the determined priorities of the data blocks to the second storage device includes:
storing the indications and offset addresses of the data blocks in an associated manner to the second storage device.

2. The method of claim 1, wherein the data to be backed up is included in a virtual disk device, and the method further includes:
generating a metadata file including the attributes of the at least one file using a file system of the virtual disk device.

3. The method of claim 1, wherein the attributes include an accessed time of the at least one file, and determining the priorities of the data blocks associated with the at least one file includes:
determining a start time of a machine where the data to be backed up is located and a current time; and
if it is determined that a first accessed time of a first file associated with a first data block is closer to the start time than a second accessed time of a second file associated with a second data block, or if it is determined that the first accessed time is closer to the current time than the second accessed time, determining that the first data block has a higher priority than that of the second data block.

4. The method of claim 3, wherein determining the priorities of the data blocks associated with the at least one file includes:
dividing time from the start time to the current time into multiple time intervals, determining that the first accessed time is within a first time interval and the second accessed time is within a second time interval; and if it is determined that the first time interval is closer to the start time than the second time interval, or if it is determined that the first time interval is closer to the current time than the second time interval, determining that the first data block has a higher priority than that of the second data block.

5. The method of claim 1, wherein determining the priorities of the data blocks associated with the at least one file includes:

if it is determined that a third data block is associated with a start file of a machine where the data to be backed up is located, setting a priority of the third data block to the highest priority.

6. The method of claim 1, wherein the indications and the offset addresses are stored in a table form.

7. A method for recovery, including:

receiving from a second storage device an indication of a first priority and an indication of a second priority that are related to data to be recovered, wherein the first priority is associated with a first set of data blocks, the second priority is associated with a second set of data blocks, and the first priority is higher than the second priority;

receiving the first set of data blocks from the second storage device;

receiving, after the first set of data blocks is completely received, the second set of data blocks from the second storage device;

determining a first set of offset addresses of the first set of data blocks;

requesting the first set of data blocks from the second storage device using the first set of offset addresses;

determining a second set of offset addresses of the second set of data blocks; and requesting the second set of data blocks from the second storage device using the second set of offset addresses.

8. The method of claim 7, further including:

storing, in a first storage device, the data blocks received from the second storage device; and recording the stored data blocks in a data block table at the first storage device.

9. The method of claim 8, further including:

searching the data block table for a data block to be accessed; and accessing the data block to be accessed from the first storage device if the data block to be accessed has been recorded in the data block table; otherwise, requesting the data block to be accessed from the second storage device.

10. A non-transitory computer readable medium comprising computer readable program code, which when executed by a computer processor enables the computer processor to perform a method for backup, the method comprising:

determining, based on attributes of at least one of one or more files included in data to be backed up, priorities of data blocks associated with the at least one file: and storing the data to be backed up and indications of the determined priorities of the data blocks to a second storage device, wherein storing the indications of the determined priorities of the data blocks to the second storage device includes:

storing the indications and offset addresses of the data blocks in an associated manner to the second storage device.

11. The non-transitory computer readable medium of claim 10, wherein the data to be backed up is included in a virtual disk device, and the method further includes:

generating a metadata file including the attributes of the at least one file using a file system of the virtual disk device.

12. The non-transitory computer readable medium of claim 10, wherein the attributes include an accessed time of the at least one file, and determining the priorities of the data blocks associated with the at least one file includes:

determining a start time of a machine where the data to be backed up is located and a current time; and if it is determined that a first accessed time of a first file associated with a first data block is closer to the start time than a second accessed time of a second file associated with a second data block, or if it is determined that the first accessed time is closer to the current time than the second accessed time, determining that the first data block has a higher priority than that of the second data block.

13. The non-transitory computer readable medium of claim 12, wherein determining the priorities of the data blocks associated with the at least one file includes:

dividing time from the start time to the current time into multiple time intervals, determining that the first accessed time is within a first time interval and the second accessed time is within a second time interval; and if it is determined that the first time interval is closer to the start time than the second time interval, or if it is determined that the first time interval is closer to the current time than the second time interval, determining that the first data block has a higher priority than that of the second data block.

14. The non-transitory computer readable medium of claim 10, wherein determining the priorities of the data blocks associated with the at least one file includes:

if it is determined that a third data block is associated with a start file of a machine where the data to be backed up is located, setting a priority of the third data block to the highest priority.

15. The non-transitory computer readable medium of claim 10, wherein the indications and the offset addresses are stored in a table form.

* * * * *